W. D. McCULLOUGH.
CLUTCH.
APPLICATION FILED JULY 19, 1920.

1,425,994.

Patented Aug. 15, 1922.

Inventor
William D. McCullough,

By

Attorneys

UNITED STATES PATENT OFFICE.

WILLIAM D. McCULLOUGH, OF DETROIT, MICHIGAN.

CLUTCH.

1,425,994. Specification of Letters Patent. Patented Aug. 15, 1922.

Application filed July 19, 1920. Serial No. 397,273.

*To all whom it may concern:*

Be it known that I, WILLIAM D. McCULLOUGH, a citizen of the United States of America, residing at Detroit, in the county of Wayne and State of Michigan, have invented certain new and useful Improvements in Clutches, of which the following is a specification, reference being had therein to the accompanying drawings.

In the operation of stamping, punching, and pressing machines which are controlled by clutches providing single or intermittent operations of the machines, the clutches are subjected to considerable wear and tear, particularly the interlocking or contacting parts of the clutches and in consequence of such wear and tear it is necessary to renew the interlocking or contacting parts from time to time and very often the entire clutch must be discarded.

My invention aims to provide a novel clutch for machines of the above type wherein the parts are constructed to receive a minimum degree of wear, and furthermore, so that the parts may be easily and quickly renewed without discarding the entire clutch structure.

My invention further aims to provide a simple and durable clutch which is positive in its action, easy to control, and highly efficient for the purposes for which it is intended.

The improvements entering into the clutch will be hereinafter described and then claimed, and reference will now be had to the drawing wherein—

Figures 1, 2:
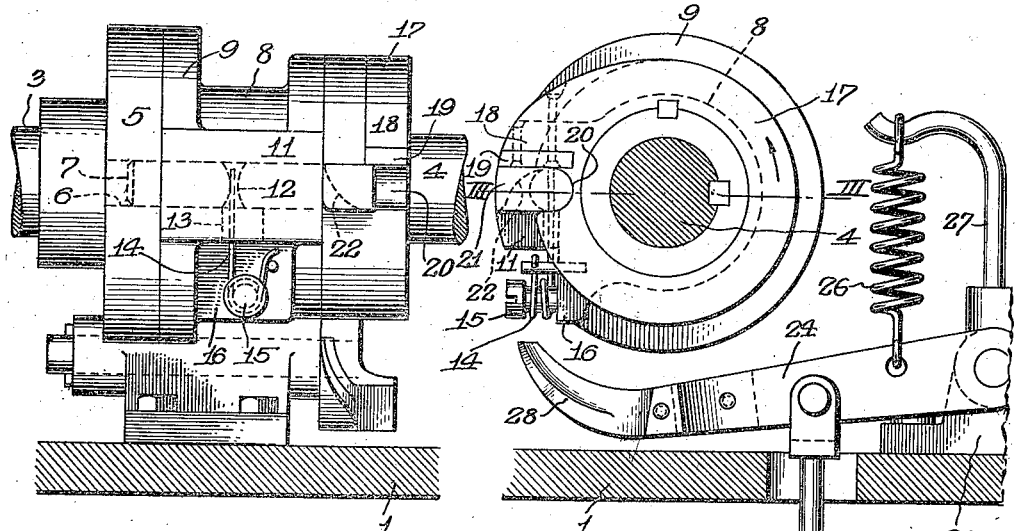
Figure 1 is a side elevation of a clutch.
Fig. 2 is an end view of the same.
Figure 3:
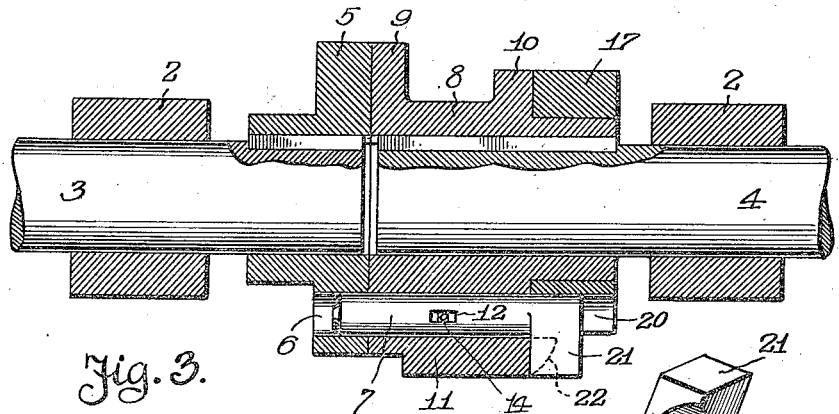
Fig. 3 is a longitudinal sectional view of the clutch taken on the plane of the line III—III of Fig. 2, and Figs. 4 and 5 are perspective views of detached renewable members of the clutch.
Figure 5:
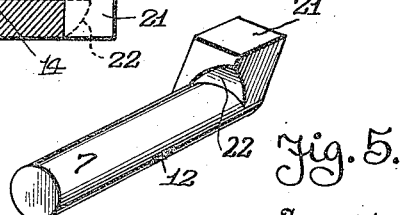
Figure 4:
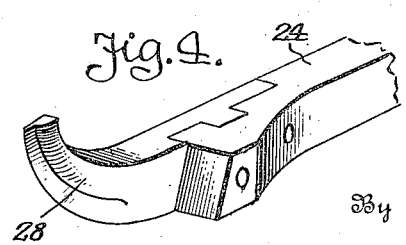

In the drawing the reference numeral 1 denotes a suitable base or bed that may be provided with bearings 2 for longitudinally aligning drive and driven shafts 3 and 4 respectively, said shafts having the confronting ends thereof in close relation.

Keyed or otherwise mounted on the end of the drive shaft 3 is a collar 5 having the face thereof provided with an opening 6 to receive a reciprocable locking pin 7.

Keyed or otherwise mounted on the end of the driven shaft 4 is a barrel 8 having collars 9 and 10 with the former confronting collar 5 and the latter adjacent the opposite end of the barrel. One side of the barrel 8 has a longitudinal housing 11 connecting the collars 9 and 10 and in which slides the reciprocable locking pin 7. Intermediate the ends of the locking pin 7 is a slot 12 which constantly registers with a slot 13 in the lower wall of the housing 11 so that the end of a spring 14 may extend through the slot 13 into the slot 12 and hold the locking pin normally against the face of the collar 5 or in the opening 6 thereof. The spring 14 is mounted on a stud 15 carried by a lug 16 of the barrel 8, and said spring is normally under tension.

Keyed or otherwise mounted on the end of the barrel 8 against the flange 10 is a stop member 17 having an offset jar 18 provided with a detachable anvil or wear plate 19, and the collar 10 and the stop member 17 are grooved or recessed, as at 20, to receive the outer end of the locking pin 7. On the outer end of the locking pin 7 is a head 21 which normally abuts the end of the housing 11 and bears against the jaw 18 and the anvil 19 thereof. The lower face of the head 21, adjacent the pin 7 is beveled or undercut, as at 22, so as to provide a cam surface against which a trip member may ride to retract the locking pin 7 and withdraw it from the opening 6 of the collar 5.

Mounted on the base or bed 1, adjacent the clutch, is a bearing 23 pivotally supporting the inner end of a trip member 24 and said trip member may be connected to a suitable operating device, for instance a treadle rod 25 extending through the base or bed 1. The trip member 24 is furthermore connected to a coiled retractile spring 26 attached to a bracket 27 of the bearing 23 and the retractile force of the spring 26 is adapted to hold the trip member normally elevated against the stop member 17. The outer end of the trip member 24 is provided with a detachable beveled curved trip finger 28 and when the rod 25 permits the spring 26 to elevate the trip member 24, the finger 28 enters the recess 22 of the head 21 and retracts the locking pin 7 against the action of the spring 14. With the locking pin 7 retracted the drive shaft 3 may revolve independent of the driven shaft 4, and the finger 28 will remain in engagement with the head 21 and said head against the anvil 19 to hold the stop member 17 and the barrel 8. The end of the locking pin 7 will ride against the face of the collar 5 or it may be held out of engagement with said collar by the trip member. When the trip member is lowered and the locking pin 7 released the pin will ride against the face of the collar 5 until the opening 6 is brought into registration with the end of the pin when said pin immediately enters the opening and establishes a driving relation between the collars 5 and 9 of the shafts 3 and 4 respectively.

After the trip member 24 is manually actuated it is immediately released so that the spring 26 may hold it against the periphery of the stop member 17 and in consequence of such position of the trip member the head 21 of the locking pin 7 will again be carried into the engagement with the trip finger 28 by the collar 8 rotating in a counterclockwise direction and as the finger 28 engages in the undercut 22, the locking pin 7 will be retracted to release the driven shaft 4 relative to the drive shaft 3. The trip finger 28 will continue to engage in the locking pin and prevent rotation of the stop member 17, until the finger 28 is lowered to release the locking pin when said pin will ride against the collar 5 until the opening 6 is again presented to the pin. The driven shaft 4 has therefore been permitted to make one revolution, but repeat or continuous rotation of the driven shaft 4 by the drive shaft 3 may be accomplished by holding the trip member 24 in a lowered position.

I attach considerable importance to the fact that the locking pin 7, the anvil 19, and the trip finger 28 may be readily renewed, when worn, without discarding other parts of the clutch. The trip finger 28 is connected to the trip member 24 by tongues and grooves, also by rivets or similar fastening means, which fastening means can be removed to permit of a new finger being installed. Since the trip finger 28 has a wedging action when retracting the locking pin wear is reduced to a minmum and the tripping mechanism may be relied upon to establish driving relations between the shafts 3 and 4 without any danger of the clutch slipping, as is often experienced with clutches having beveled interlocking jaws.

One embodiment of my invention has been illustrated, but it is to be understood that the structural elements are susceptible to such variations and modifications as fall within the scope of the appended claims.

What I claim is:—

1. In a clutch, a drive shaft, a driven shaft adapted to rotate counterclockwise, confronting collars carried by said shafts, a stop member supported by said driven shaft, a reciprocable locking pin slidable in said stop member and a collar of said driven shaft and adapted to enter the collar of said drive shaft, an undercut head carried by said pin, means for holding said pin in engagement with said drive shaft collar, and a trip member adapted to engage said stop member and recede into the undercut of said pin head to move said pin out of engagement with said drive shaft collar, said trip member preventing further rotation of said stop member until said trip member is retracted.

2. A clutch as characterized in claim 1, wherein said stop member has a renewable anvil engaged by the head of said pin, and a renewable trip finger is detachably carried by the outer end of said trip member to engage said pin.

In testimony whereof I affix my signature in the presence of two witnesses.

WILLIAM D. McCULLOUGH.

Witnesses:
O. F. BARTHEL,
A. M. DORR.